Jan. 13, 1953  G. NELSON  2,625,323
CASH REGISTER
Filed Jan. 22, 1948  5 Sheets-Sheet 3

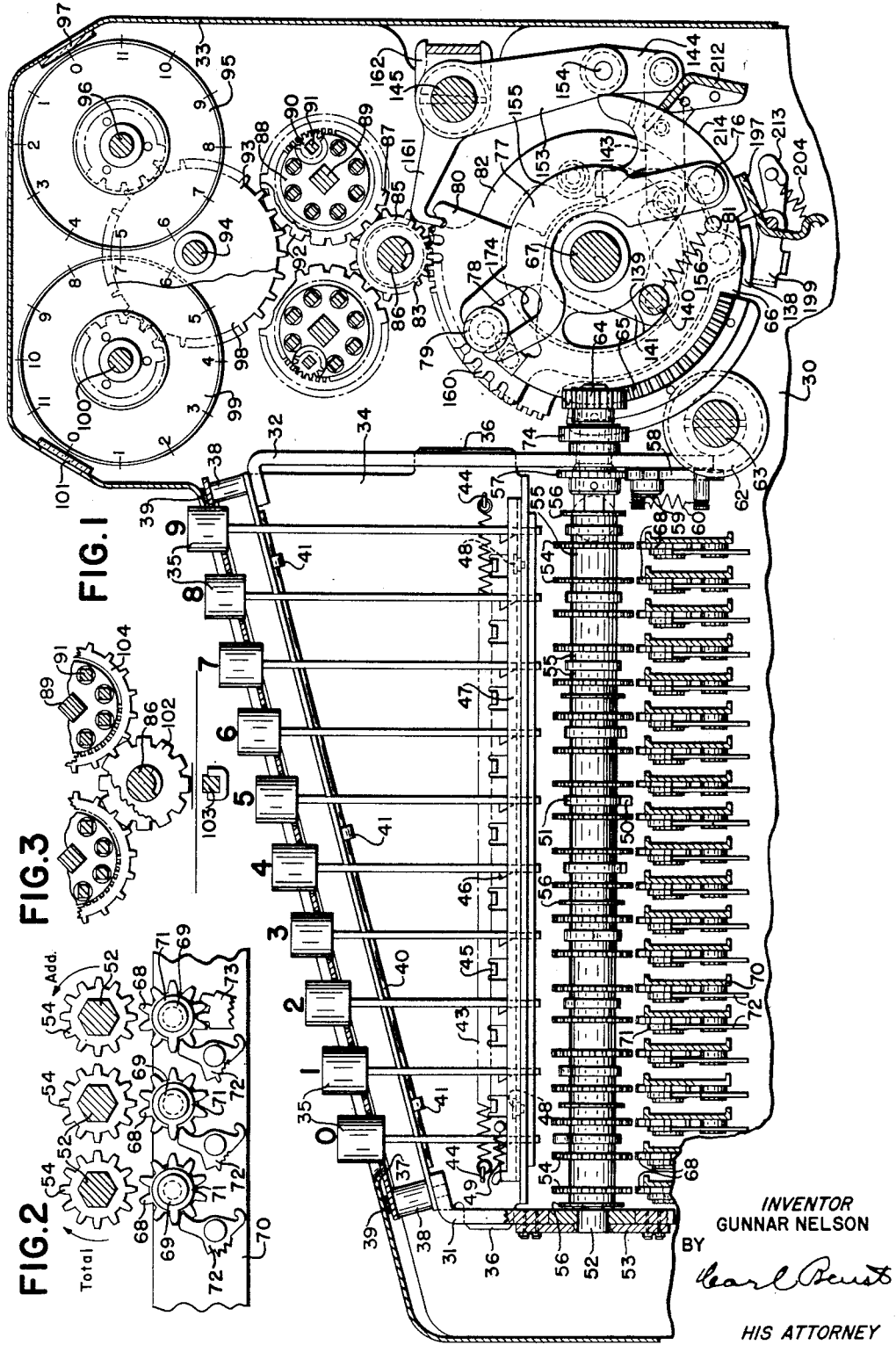

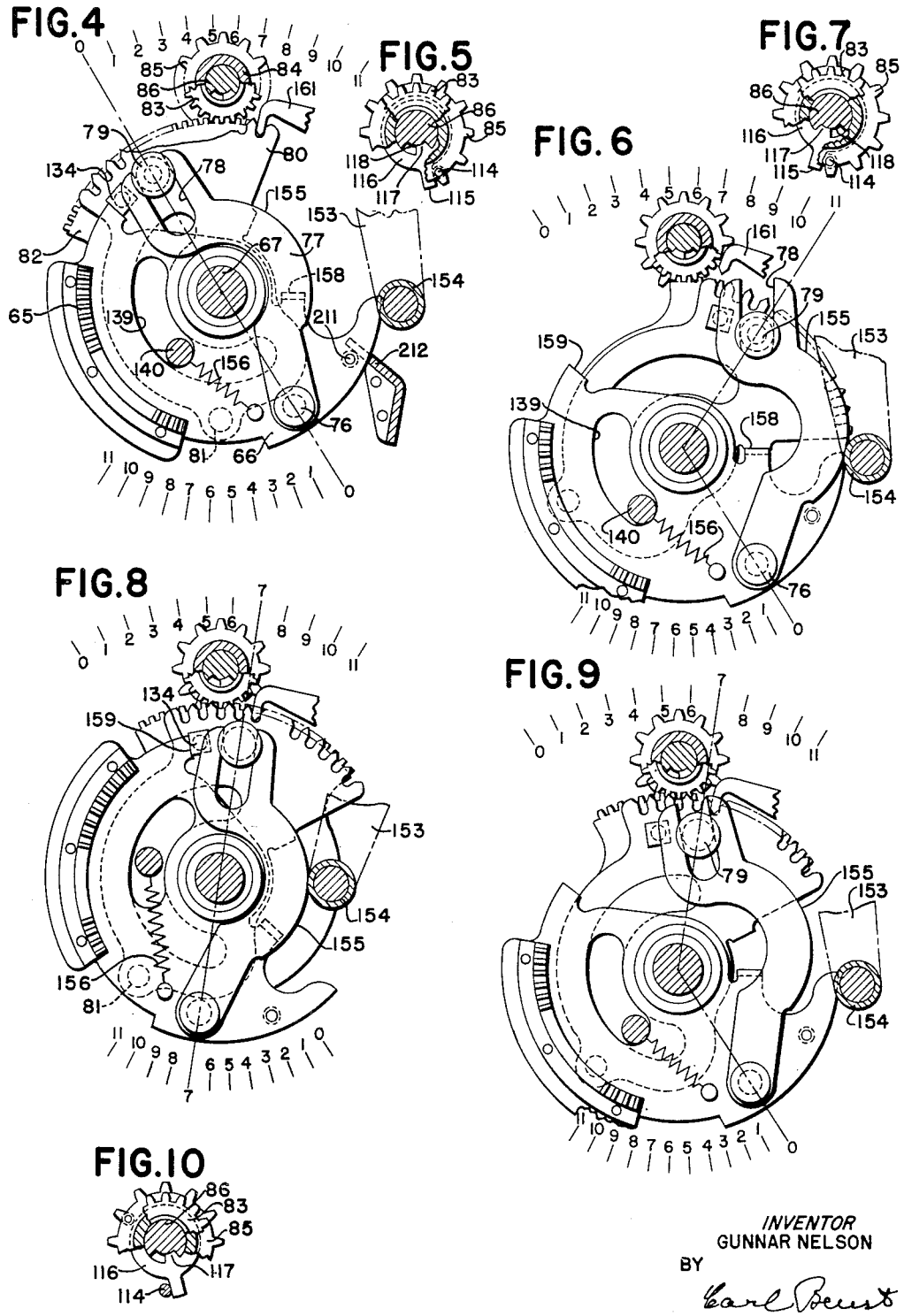

*INVENTOR*
GUNNAR NELSON
BY
*Earl Brust*
HIS ATTORNEY

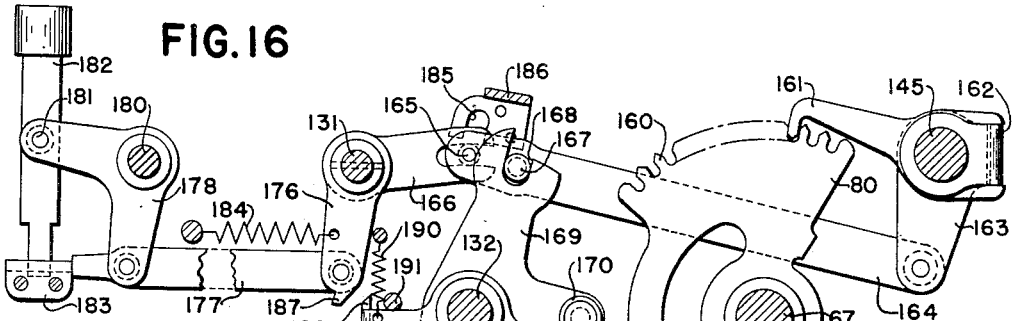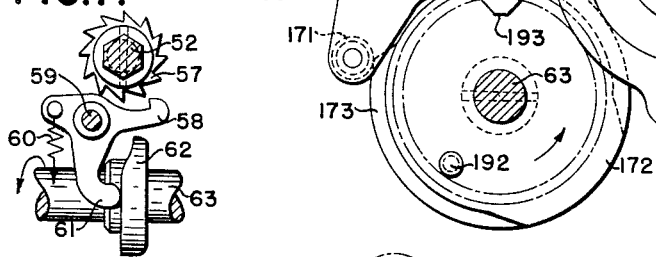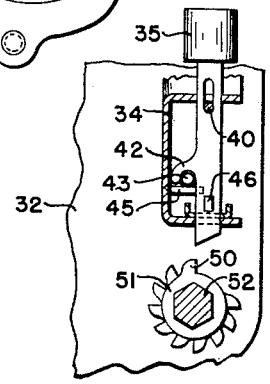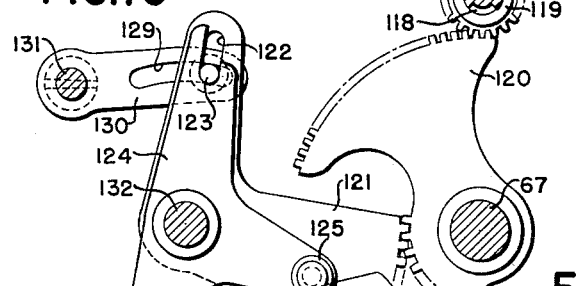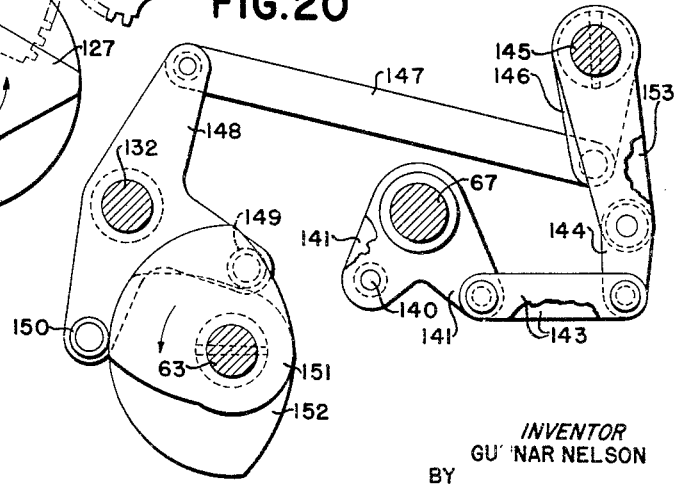

INVENTOR
GUNNAR NELSON
BY
Carl Beust
HIS ATTORNEY

Patented Jan. 13, 1953

2,625,323

UNITED STATES PATENT OFFICE 2,625,323

CASH REGISTER

Gunnar Nelson, Dayton, Ohio, assignor to The National Cash Register Company, Dayton, Ohio, a corporation of Maryland Application January 22, 1948, Serial No. 3,658

21 Claims. (Cl. 235—6)

The present invention is directed to differential mechanisms for accounting machines and/or cash registers and discloses in particular a unique mechanism for actuating simultaneously the plurality of totalizers with which the machine is equipped.

One of the objects of the present invention is the provision of a unique differential mechanism for accounting machines and/or cash registers.

Another object of the present invention is to provide a compact and efficient differential mechanism for entering values in a plurality of totalizers simultaneously.

Another object of the present invention is the provision of a differential mechanism including primary and secondary members and an auxiliary contrivance driven by the primary member and positioned by the value-entering elements, said contrivance having thereon a driving element for each corresponding totalizer element, so that any or all of said totalizer elements may be actuated in one operation of the machine.

Still another object is to provide a novel differential mechanism for accounting machines, said mechanism including an auxiliary contrivance constructed and arranged to coact with the corresponding effective denominational value-entering element and to coact with any or all of the corresponding denominational totalizer elements to enter the value of the effective value-entering element therein.

A further object is the provision of a novel differential device, including primary and secondary members and an auxiliary contrivance actuated by the primary member and positioned by the corresponding value-entering elements, said auxiliary contrivance being capable of coacting simultaneously with any or all of the corresponding totalizer elements to enter the value of the effective value-entering element therein.

Another object of the present invention is to provide a differential mechanism, including a primary member and a secondary member and a rotatable contrivance connected to and actuated by the primary member and constructed and arranged to coact with the corresponding value-entering elements and the corresponding totalizer elements to transmit values from said value-entering elements to the primary member and to any or all of the totalizer elements in one operation of the machine.

A further object is the provision of a differential mechanism for accounting machines having novel means for eliminating the printing and indicating of zeros in the higher inactive orders.

A still further object is the provision of a differential device for accounting machines having a novel mechanism for repeating the amount of an immediately preceding transaction without foreknowledge that such amount is to be repeated.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In the drawings:

Fig. 1 is a transverse cross-sectional view of the machine taken just to the right of an intermediate order amount bank and showing in particular the differential mechanism for said amount bank.

Fig. 2 is a fragmentary detail view showing a portion of one of the totalizers with which the machine is equipped.

Fig. 3 is a fragmentary detail view of one adaptation of printing mechanism.

Fig. 4 is a right side elevation of the differential mechanism of Fig. 1, showing said mechanism in zero position.

Fig. 5 is an enlarged detail view showing the mechanism for restoring the secondary member of the differential mechanism to starting position, in normal or home position.

Fig. 6 shows the differential mechanism of Fig. 4 after the secondary member thereof has been restored to starting position.

Fig. 7 is an enlarged detail view showing the restoring mechanism after its initial movement has been completed to restore the secondary member of the differential mechanism to starting position, as shown in Fig. 6.

Fig. 8 illustrates the positioning of the primary member of the differential mechanism to the value of the depressed amount key.

Fig. 9 illustrates the positioning of the secondary differential member, under influence of the primary member, to the value of the depressed amount key.

Fig. 10 is an enlarged detail view showing the restoring shaft and associated mechanism in normal or home position.

Figure 11:
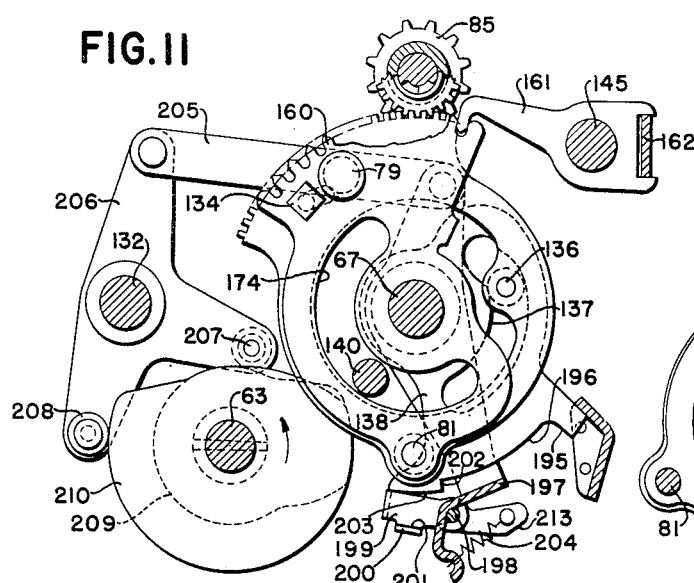
Fig. 11 is a right side elevation of the differential mechanism of Figs. 1 and 4 and shows in particular the zero elimination mechanism and the driving means therefor.
Figure 12:
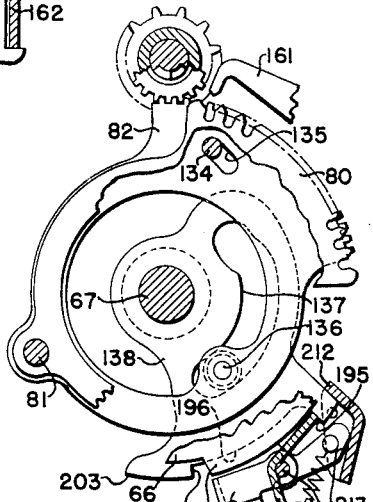
Figure 13:
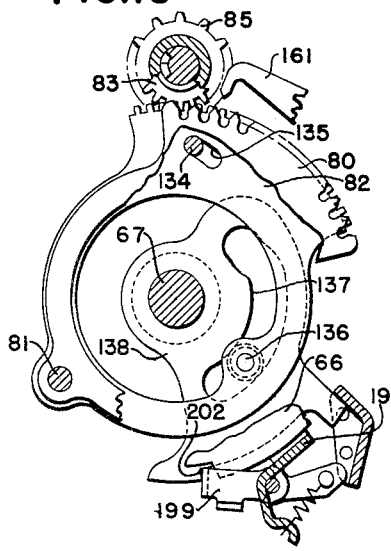
Figure 14:
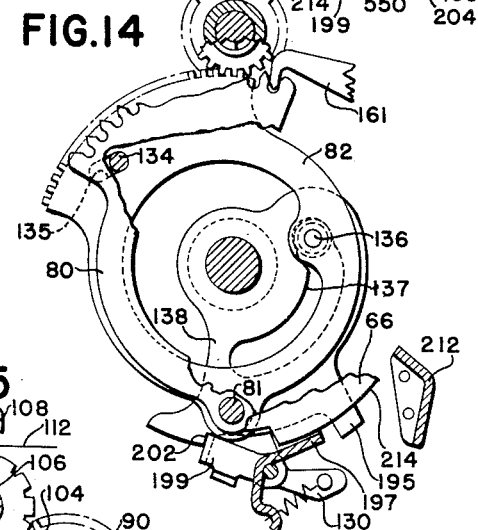

Figs. 12, 13, and 14 are detail views of the zero elimination mechanism of Fig. 11 and show in particular the different stages of movement of said mechanism during one machine operation.

Figure 15:
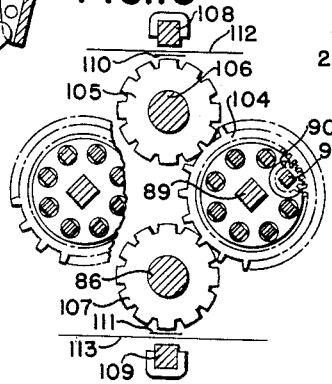

Fig. 15 is a second adaptation of printing mechanism which may be used in conjunction with the printing mechanism shown in Fig. 3.

Fig. 16 is a right side elevation of the mechanism for repeating the amount of the previous operation.

Fig. 17 is a detail view of the ratchet and pawl mechanism for preventing backing up of the auxiliary shaft and the corresponding primary member of the differential mechanism during initial movement thereof.

Fig. 18 is a detailed sectional view, as observed from the front of the machine, showing one of the amount banks and the differential positioning mechanism associated therewith.

Fig. 19 is a right side elevation showing the mechanism for restoring the secondary differential members, and also showing the mechanism for disabling said restoring mechanism in repeat operations.

Fig. 20 is a detail view of the differential driving mechanism.

Figure 21:
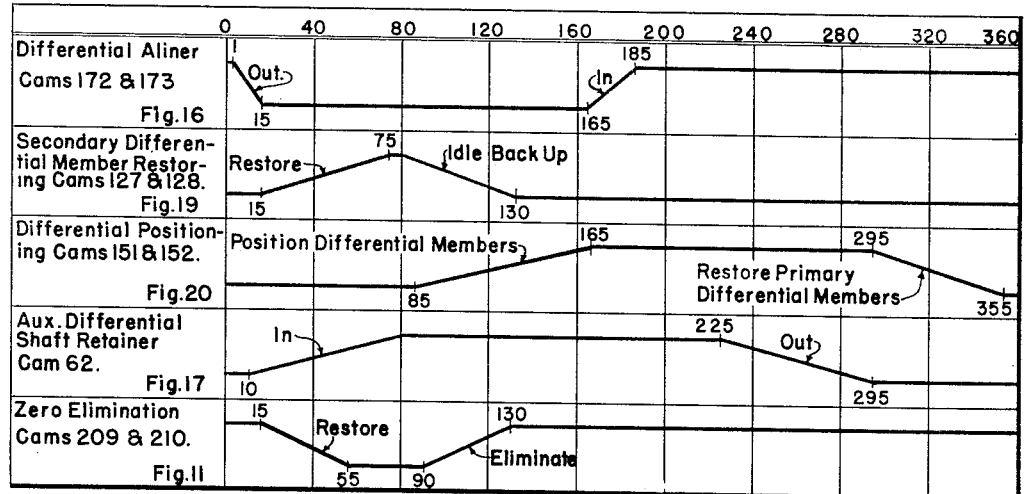

Fig. 21 is a time chart showing in graphic form the movements of the more important mechanisms of the machine of this invention.

Figure 22:
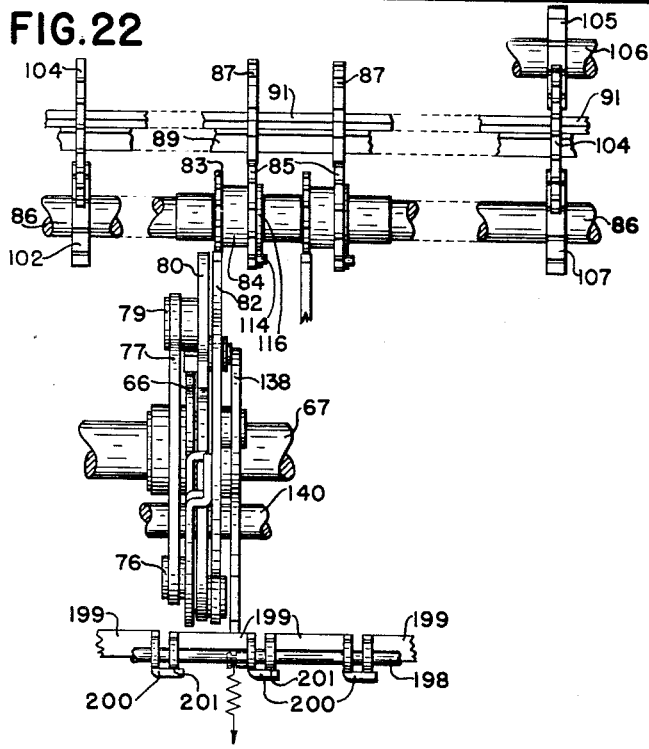

Fig. 22 is a side view, as observed from the rear of the machine, of the differential mechanism shown in Fig. 4, and a portion of the printer and indicator positioning mechanism associated therewith.

GENERAL DESCRIPTION

The present invention is directed to a novel differential mechanism for use in accounting machines, cash registers, and analogous business machines, there being such a differential mechanism for each denominational order of the machine, and each differential mechanism comprising a primary member and a secondary member operatively connected to each other by a beam which, in cooperation with the differential driving mechanism, positions said primary and secondary members in accordance with the value of the depressed amount key.

Each primary differential member has a segmental portion with teeth formed therein, which engage the teeth of a pinion secured on the inward end of a corresponding auxiliary differential shaft which extends at right angles to the main differential shaft, which latter rotatably supports the primary and secondary differential members. The auxiliary differential shaft extends horizontally the entire length of the corresponding amount bank and is disposed directly beneath and in parallel alinement with the lower ends of the stems of the corresponding amount keys. The auxiliary differential shaft has a stop disk thereon for each amount key, said stop disks being equally spaced so as to be in alinement with the corresponding amount keys.

In the present adaptation of the invention, each amount bank comprises ten amount keys, including a zero key and nine digit keys, said zero key taking the place of the usual zero stop mechanism, which may be incorporated in any suitable form in the present machine, if desired.

Depression of an amount key moves the lower end of its stem into the path of a corresponding stopping lug on the corresponding stop disk, said lugs being arranged progressively to permit increased rotation of the auxiliary differential shaft, depending upon the value of the amount keys with which they coact. For example, the zero key prevents any movement of the auxiliary differential shaft and the primary differential member, the "1" amount key permits one increment of movement of said shaft and said primary differential member, the "2" amount key permits two increments of movement, and so on.

The present differential mechanism differs from the usual differential mechanism in that, instead of the usual ten increments or steps of movement, it is arranged for twelve steps of movement in order to accommodate British currency, in case this is desirable.

The auxiliary differential shaft for each denominational order of the present machine also supports a plurality of drive gears for driving the corresponding totalizer wheels of the totalizers with which the machine is equipped. In the present adaptation, there are twenty such drive gears for actuating the corresponding denominational wheels of the twenty totalizers with which the machine is equipped. However, the number of totalizers is primarily a matter of choice, as the novel arrangements of the totalizer-actuating portion of the differential mechanism makes it a rather simple matter to increase the totalizer capacity of the machine with little mechanical difficulty and without materially increasing the overall dimensions of the machine.

As stated above, the present machine is provided with twenty totalizers, each of which comprises a totalizer wheel for each denominational order of the machine, and overflow totalizer wheels if desirable or necessary. The wheels of each totalizer are mounted on a plate which forms a complete unit of said totalizer, which may be readily removed from or installed in the machine without in any way interfering with the other totalizers.

Any suitable type of transfer mechanism may be used in connection with the totalizers for transferring tens digits from lower to higher denominations in adding operations, and vice versa in subtracting operations, and each totalizer wheel is provided with a transfer tripping cam which also serves, in cooperation with a corresponding zero stop pawl, as a zero stop to stop the corresponding totalizer wheels in zero position in total and sub-total recording operations.

The secondary differential member has connected thereto a printer and indicator positioning segment in turn connected by a transmission gearing of the well-known Kreider type to corresponding printing wheels and indicators.

In the first part of the machine operation, the secondary differential members and connected mechanism are restored by a unique restoring mechanism from their preset position to a normal or starting position, which in this case is the eleventh position of the differential mechanisms, after which the differential driving mechanism contacts the beams, one of which, as previously explained, connects the primary and secondary members of each order for differential movement, and, inasmuch as the secondary members are connected to the printing and indicating mechanisms and consequently carry more load and offer more resistance than the primary members, said secondary members remain stationary while the beam mechanism drives the primary members and the corresponding auxiliary differential shafts. Initial movement of the primary members and the auxiliary shafts continues until the stop lugs on the corresponding stop disks contact the lower ends of the depressed amount keys to position said auxiliary shafts and the primary differential members in accordance with the values of said depressed amount keys. The above-described termination of initial movement of the auxiliary shafts and the primary differential members causes the beam mechanism, under influence of the differential driving mechanism, to impart positioning movement to the secondary differential members and connected mechanism to position said members and their corresponding type wheels and indicators in accordance with the position of the auxiliary shafts and the primary members. After said parts are so positioned, an aliner mechanism engages corresponding tooth spaces in the secondary differential members to aline and hold said parts during functioning of the impression mechanism.

The differential driving mechanism, in addition to driving the differential mechanisms through their corresponding beams, as explained above, also oscillates a differential restoring rod back and forth during machine operation. The restoring rod extends through concentric restoring slots in the primary differential members and during its initial movement moves in unison with said primary members in their initial movement, to be positioned under influence of the depressed amount keys, as explained above. The slots for the restoring rod are sufficiently long to permit full movement of said bar or rod without in any way interfering with the proper positioning of the primary members. In the present adaptation, a spring has been connected between the restoring rod and each of the primary differential members, whereupon the initial movement of said restoring rod, through said springs, yieldingly carries said primary members in unison therewith until such movement of said primary members is interrupted by the depressed amount keys, as explained above. These springs are often referred to as "leading springs" and have been included in the present differential mechanism merely as an added safety precaution and, if desired, may be omitted without in any way detracting from the efficiency and proper operation of the differential mechanism. Return movement of the restoring rod causes it to pick up the primary differential members and return them and their corresponding auxiliary shafts from their set positions to their home or zero positions. The secondary differential members, the printer operating segments connected thereto and moving in unison therewith, and the corresponding type wheels and indicators which they drive remain in set positions at the end of machine operation.

In subtract operations, the wheels of the selected totalizer or totalizers are engaged with the corresponding drive gears on the auxiliary differential shafts, prior to initial movement of said shafts, which movement rotates said wheels in a subtractive direction to subtract therefrom the value of the depressed amount keys. After the selected totalizers have thus been actuated, they are disengaged from the drive gears, prior to return movement of said gears.

In adding operations, the wheels of the selected totalizers are engaged with the corresponding drive gears after they have been positioned by the depressed amount keys and prior to return movement of said gears, which movement rotates said wheels in an additive direction to add therein the value of said depressed amount keys. After the selected totalizers have thus been actuated, they are disengaged from the drive gears.

In total recording operations, the wheels of the selected totalizer are engaged with the corresponding drive gears on the auxiliary differential shafts prior to initial movement of said shafts, which movement, inasmuch as no amount of keys are depressed, rotates said selected wheels in a subtractive or reverse direction until said wheels are stopped at zero position by the teeth on their transfer tripping cams contacting the corresponding zero stop pawls. This positions the auxiliary differential shafts and their corresponding primary differential members in accordance with the value of the amount standing on said totalizer wheels, and said primary members in turn position the corresponding secondary differential members and the corresponding printing wheels and indicators in accordance with the value standing on said selected totalizer wheels. While the wheels of the selected totalizer are standing at zero and prior to return movement of the primary differential members and their corresponding auxiliary shafts, said wheels are disengaged from the drive gears so that they will remain in a zeroized condition.

The amount cleared from any totalizer may be transferred to any or all of the remaining totalizers with which the machine is provided, either additively or subtractively, by setting up the proper controls prior to such clearing operation, to select and condition the desired totalizer for such transfer total operation.

A sub-total recording operation is similar in every respect to a total recording operation, with the exception that the wheels of the selected totalizer remain in engagement with the corresponding drive gears during their return movement, which movement restores said wheels to their original positions.

The novel construction of the differential mechanism of the machine of this invention makes possible the inclusion of a novel repeat mechanism by means of which the amount of any previous operation may be repeated without any foreknowledge on the part of the operator that such amount is to be repeated.

As previously mentioned, the secondary differential members, their printer segments, and the printing wheels and indicators remain in set position at the end of machine operation, and are returned to a starting position at the beginning of the succeeding machine operation. All that is necessary in repeating the amount of the previous operation is to depress a repeat key with which the machine is provided, and this depression disables the mechanism for returning the secondary differential members and connected mechanism from preset position to starting position and simultaneously disables the secondary member aliner mechanism, whereupon all of said secondary differential members and connected mechanism remain alined in the positions in which they were set in the previous machine operation, and subsequent functioning of the beam mechanism causes the primary differential members to be positioned in accordance with the positions of the corresponding secondary members to repeat the amount of the previous operation.

The differential mechanism likewise includes a zero elimination mechanism which functions automatically to eliminate the printing and indicating of zeros in all higher denominations in which the primary differential members are retained in zero position by the depressed zero keys.

The printer positioning segment carried by each secondary differential member is mounted on said member for slight movement relative thereto, and each of said members carries a roller which engages a cam slot in a corresponding operating segment. When a primary member remains in zero position, the corresponding operating segment is engaged by a driving pawl and is rocked sufficiently to cause the cam slot, in cooperation with the corresponding roller, to rock the corresponding printer segment, printing wheels, and indicators one step beyond zero position to a blank position, so that the zeros will not be recorded and indicated in the higher denominational orders, in which no amount keys are depressed. When an amount key, other than the zero key, is depressed in a higher order, movement of the corresponding primary differential member out of zero position disables the driving pawl for the corresponding zero elimination segment, and said pawl, through inter-connections with the adjacent lower order pawl, disables it, and so on, through all the lower order denominations, so that the zeros in said lower order denominations will be recorded and indicated.

In the present disclosure, which is confined primarily to the novel differential mechanism, the transfer mechanism for the totalizers has been shown only in diagrammatic form, as any type of suitable transfer mechanism may be used. Likewise in the present disclosure no engaging and disengaging mechanism for the totalizers and the controlling mechanism therefor has been shown, as this may be of any suitable form and a description thereof is believed unnecessary for a complete and proper understanding of the differential mechanism.

The mechanism explained in general above, which are pertinent to the present invention, will be explained in detail in the ensuing pages.

DETAILED DESCRIPTION

Machine framework and amount key banks

The framework of the machine of the instant invention includes right and left frames 30, only the left frame being shown in Fig. 1, secured in properly spaced relationship to each other by front and back frames 31 and 32, extending therebetween and arranged to support the key banks and the mechanism associated therewith. The main frames 30 may be secured to any suitable type of base (not shown) and may be further secured in fixed relationship to each other by various cross frames, rods, and shafts, as is the usual practice in machines of this type. The framework and the mechanism of the machine are enclosed in a suitable case or cabinet 33, which may be secured to the base of the machine, if desired, or to the main frames 30.

In the present application, only one amount bank and its corresponding differential mechanism have been shown and will be described as representative of all the amount banks and their differential mechanisms. This is believed to be sufficient for a proper understanding of these mechanisms, as they are substantially alike in construction and operation. Under normal conditions, a standard type of machine will be provided with eight amount banks and three transaction banks. However, this is a matter of choice and may be varied to suit the requirements of the business system to which the machine is being applied.

Each amount bank comprises a key frame 34 (Figs. 1 and 18) made of suitable material, such as sheet metal, having bent-over upper and lower edges, with alined slots therein for depressibly supporting the stems of a plurality of amount keys 35, including a zero key. The side portion of the key frame 34 has, formed in its forward and rearward edges, fins 36, which fit snugly in corresponding vertical slots in the front and back frames 31 and 32 to locate said key frame laterally in the framework, and the bent-over upper edge of said frame 34 extends over and rests on corresponding bent-over portions of the front and back frames 31 and 32, as shown in Fig. 1. It will be noted that the upper edge of the key frame 34 is formed in angular relationship to the lower edge thereof to provide an inclined keyboard, which has the desirable qualities of superior visibility and accessibility for the operator.

The upper ends of the amount keys 35 terminate in convenient finger pieces, which extend through clearance openings in a keyboard plate 37 (Fig. 1). The keyboard plate 37 is properly spaced in parallel relationship to the angular portion of the key frames 34 by means of hubs 38 secured thereto. Screws 39, extending through central holes in the hubs 38, and through corresponding clearance holes in opposite ends of the bent-over upper portions of the key frame 34, are finally threaded into corresponding tapped holes in the bent-over portions of the front and back frames 31 and 32 to secure the keyboard plate 37 in place.

The amount keys 35 are limited in their upward and downward travel and are retained in the alined vertical slots in the bent-over portions of the key frame 34 (Figs. 1 and 18) by a wire or rod 40, which extends through corresponding vertical slots in the stem portions of said amount keys 35 and is retained in place against the bottom surface of the upper bent-over portion of said key frame 34 by means of three eyes 41, formed downwardly out of said upper portion. Each of the amount keys 35 (Fig. 18) has a hook-shaped extension 42, which overlies and coacts with a closely coiled spring 43, stretched horizontally substantially the full length of the key frame 34 (Fig. 1) between hooks 44 secured in said key frame. Between the amount keys 35 are ears 45 bent inwardly from the side member of the key frame 34, said ears extending beneath and providing uniformly spaced supports for the long return spring 43, so that only a relatively short portion of said spring will be deformed upon depression of an amount key 35, to insure proper functioning and uniform action of said spring in yieldingly returning and maintaining said amount keys 35 in undepressed positions.

Each of the amount keys 35 (Figs. 1 and 18) has, pushed out of the lower end of its stem portion, a lug 46, which coacts with the forward edge of a corresponding slot in a detent plate 47 slidably supported on the upper surface of the lower bent-over portion of the frame 34 by means of slots therein, in cooperation with two shoulder studs 48 secured in said bent-over portion. A spring 49 urges the detent 47 rearwardly (Fig. 1) to normally maintain the forward edges of the slots therein in yielding contact with the stems of the amount keys 35.

Depression of one of the amount keys 35, against the action of the spring 43, causes the corresponding lug 46, in cooperation with the forward edge of the corresponding slot in the detent 47, to shift said detent forwardly against the action of the spring 49, until said lug 46 moves beneath the forward edge of said slot, whereupon the spring 49 returns said detent a slight distance rearwardly to move the forward edge of said slot over said lug 46 to retain said amount key 35 in depressed position.

Any suitable means may be provided for shifting the detent 47 (Figs. 1 and 18) forwardly to release the depressed amount key 35, and likewise any suitable automatic means may be provided for shifting said detent 47 forwardly near the end of machine operation to release the depressed amount key. The amount keys 35 of the amount bank, shown in Fig. 1, embody what is known as "flexible key action," in that the depression of an amount key, after another amount key in the same bank has previously been depressed, causes the lug 46 on the latter depressed key to shift the detent 47 forwardly to release the previously depressed amount key to insure that only the latter depressed amount key remains depressed.

*Totalizers and the driving means therefor*

Depression of any one of the amount keys 35 (Figs. 1 and 18) moves the lower end of its stem into the path of a lug 50 on a corresponding stop disk 51 having a hexagonal hole which fits snugly over a hexagonal portion of an auxiliary differential shaft 52 having trunnions on each end, the rearward one of which fits in a hub secured in the back frame 32 and the forward one of which fits in a journal bearing 53 secured to the front frame 31. Assembled on the auxiliary differential shaft 52 is a plurality of totalizer drive gears 54, uniformly spaced in relation to each other and in relation to the stop disks 51 by means of spacing collars 55 of proper dimensions. The entire assembly of totalizer drive gears, stop cams, and spacing collars is retained and properly positioned on the shaft 52 by a plurality of retaining clips 56, which engage corresponding annular grooves in said shaft 52.

Secured on the rearward trunnion of the auxiliary differential shaft 52 is a ratchet 57 (Figs. 1 and 17), the teeth of which coact with a pawl 58 free on a stud 59 in the frame 32, said pawl being urged counter-clockwise (Fig. 17) by a spring 60 to normally maintain a depending finger 61 thereof in engagement with the face of a cam 62 secured on a main drive shaft 63 journaled in the main frames 30 of the machine.

The main shaft 63 is driven one counter-clockwise revolution, as viewed in Fig. 1, each machine operation by any suitable type of electrical means (not shown), which may be clutched to said main shaft by depression of starting bars or so-called motorized control keys (not shown) and which may be automatically declutched from said shaft after it has made one complete revolution. Manual means (not shown) may also be provided for rotating the shaft 63 in case it is desired or necessary to operate the machine manually.

The pawl 58 (Figs. 1 and 17) coacts with the teeth of the ratchet 57 to prevent retrograde movement of the shaft 52 while it is being positioned under influence of the depressed amount keys 35, as will be explained more in detail later.

Secured on the extreme rearward end of the shaft 52 (Fig. 1) is a pinion 64, which meshes with teeth in a segmental face gear 65 secured to a primary differential member 66 free on a main differential shaft 67 supported by the main frames 30. It will be noted that the axes of the auxiliary differential shaft 52 and the main differential shaft 67 are located at right angles to each other and in a horizontal plane. It will also be noted, by referring to Fig. 1, that removal of the journal bearing 53 from the machine exposes an opening in the frame 31, which permits the withdrawal of the entire auxiliary shaft assembly therethrough when the pinion 64 is removed from the rearward end of said shaft.

Adjacent the pinion 64 (Fig. 1) and free on the shaft 52 is a roller 74, which coacts with the segmental portion of the adjacent lower order primary member 66, carrying the corresponding segment 65, to maintain the teeth of said segment in proper mesh with the corresponding pinion 64 and to eliminate any tendency of said primary member to spring out of vertical alinement under extreme operating conditions.

The totalizer drive gears 54 (Figs. 1 and 2) coact with and drive corresponding totalizer wheels 68 rotatably supported by corresponding studs 69 secured in a totalizer plate 70, which is removably mounted in the main framework of the machine. Fig. 2 shows the arrangement of three denominational orders of auxiliary shafts 52, drive gears 54, and corresponding totalizer wheels 68, from which it will be observed that each totalizer plate 70 carries all the different denominational orders of totalizer wheels 68 of one totalizer in a compact and removable unit. Each totalizer wheel 68 (Figs. 1 and 2) has integral therewith a combined stop and tripping cam 71, with teeth which coact with corresponding zero stop pawls 72 rotatably supported on corresponding studs in the plate 70, to locate the corresponding totalizer wheels 68 in zero position in total and sub-total recording operations, as will be explained later. The teeth of the tripping cams 71 (Fig. 2) likewise coact with transfer tripping pawls (not shown), which pawls control the operation of corresponding transfer segments 73 for transferring tens digits from lower to higher denominations in adding operations and vice versa in subtracting operations.

Mechanism which is not shown herein and which constitutes no pertinent part of the present invention is provided for selectively shifting the plates 70 up and down to engage and disengage the corresponding totalizer wheels 68 with and from the drive gears 54 in proper timing for the type of operation being performed.

As previously explained, depression of one of the amount keys 35 (Figs. 1 and 18) moves the lower end of its stem into the path of the corresponding lug 50 on the corresponding stop disk 51. Initial clockwise movement (Fig. 1) of the primary differential member 66 revolves the auxiliary shaft 52 and the parts thereon also clockwise, as viewed in Fig. 18, until the lug 50 strikes the lower end of the depressed amount key 35, which positions said shaft 52 and the primary differential member 66 in accordance with the value of the depressed amount key.

In subtracting operations, the wheels 68 (Figs. 1 and 2) of the selected totalizer or totalizers are engaged with the corresponding drive gears 54 prior to their initial movements, which movements rotate said wheels in a subtractive direction to subtract therefrom the values of the depressed amount keys. After the amounts have been subtracted from the selected totalizer wheels, they are disengaged from the drive gears 54 prior to return movement to zero position of said drive gears, the auxiliary shafts 52, and the primary differential members 66 in the latter part of machine operation, as will be explained presently.

In adding operations, the wheels of the selected totalizer or totalizers are engaged with the corresponding drive gears 54 after said gears have been positioned by the corresponding amount keys 35, and return movement of said gears rotates said selected wheels in an additive direction to add therein the values of said depressed amount keys 35.

In adding and subtracting operations, the zero stop pawls 72 (Figs. 1 and 2) are rocked out of the path of the teeth of the corresponding stop cams 71 so as not to interfere with the proper positioning of the totalizer wheels. However, in sub-total and total recording operations, said stop pawls 72 are moved into the path of the corresponding stop cams to stop the totalizer wheels in zero position.

In total recording operations, the selected totalizer is engaged and disengaged in exactly the same time as in subtract operations. Prior to initial movement of the primary differential members, the auxiliary shafts 52, and the drive gears 54, the wheels of the selected totalizer are engaged with said drive gears, and initial movement of said parts rotates said wheels in a reverse direction until the teeth of the stop cams 71 contact the corresponding stop pawls 72 to locate said wheels in zero position and to position the totalizer drive gears 54, the auxiliary shafts 52, and the primary differential members 66 in accordance with the values standing on said totalizer wheels. In total recording operations, after the wheels of the selected totalizer have been zeroized, said wheels are disengaged from their corresponding drive gears 54, so that they will remain in a zeroized condition.

The only difference between a total recording operation and a sub-total recording operation is that in sub-total recording operations the wheels of the selected totalizer remain in engagement with the corresponding drive gears 54 during their return movement, which movement restores said wheels to their original positions.

It will be noted by referring to Fig. 1 that each denominational order of the present machine is provided with twenty totalizer drive gears 54, which coact with and drive the corresponding wheels of twenty totalizers 70. However, the number of totalizers with which the machine is equipped is largely a matter of choice, as a greater or smaller number of said drive gears 54 may be assembled on each of the shafts 52, and more or fewer totalizers 70 may be provided for actuation by said drive gears. Likewise, if desired, each of the auxiliary shafts 52 may be geared to and drive similar shafts located directly beneath the totalizers 70 for actuating more totalizers located directly beneath said shafts. Likewise, if desired, each of the shafts 52 may be extended forwardly to provide room for additional drive gears 54, which may be used to actuate or drive additional totalizers located therebeneath.

The transfer segments 73 (Fig. 2) provide means for retaining and alining the corresponding totalizer wheels 68 when they are disengaged from the corresponding drive gears 54, said transfer segments being mounted on a framework (not shown) which is movable in relation to the totalizer framework 70, so that said segments may travel upwardly with said totalizer framework until the corresponding wheels are engaged with the drive gears 54, after which said segments are moved downwardly out of the path of the teeth of said totalizer wheels.

*Amount differential mechanism*

As previously stated, the auxiliary shaft 52 of the denominational order of differential mechanism shown in Figs. 1 and 4 to 9 inclusive forms a connecting link between the primary member 66 of the corresponding differential mechanism, the corresponding row of amount keys 35, and the corresponding denominational order of totalizer wheels 68. In other words, the auxiliary shaft 52 functions in adding and subtracting operations to transfer the value of the depressed amount key 35 to the primary differential member, which positions the corresponding secondary differential member in accordance therewith, and said secondary member in turn positions the corresponding printing wheels and indicators, as will be explained presently. In adding and subtracting operations, the shaft 52, the stop disks 51, and the gears 54 form a connecting link between the amount keys 35 and the corresponding totalizer wheels, so that amounts set up on said keys may be entered, either positively or negatively, into said corresponding wheels of the selected totalizers. In this connection, it is well to remember that in adding and subtracting operations any number of selected totalizers may be actuated at the same time. In sub-total and total recording operations, however, it is possible to select only one totalizer at a time for actuation.

In sub-total and total recording operations, the auxiliary differential shaft 52 forms a connecting link between the selected totalizer and the primary differential member 66, so that the values of the amounts stored in the corresponding totalizer wheels may be transmitted through said shaft 52 to the primary differential member and thence to the secondary differential member and to the corresponding printing wheels and indicators.

Directing attention to Figs. 1, 4 to 9 inclusive, and 22, the primary differential member 66 carries a stud 76, which pivotally supports the lower end of a beam 77 having a slot 78 in its upper end, which engages a stud 79 in a secondary differenial member 80 rotatably supported by the shaft 67. The secondary member 80 carries a stud 81, which pivotally supports a printer positioning segment 82 having teeth which mesh with corresponding teeth in a pinion 83 connected by a hub 84 to a gear 85, said hub being rotatably supported on a secondary member restoring shaft 86 journaled in the main frames 30. The gear 85 (Figs. 1 and 22) meshes with and drives an internal-external gear 87, the internal teeth of which bear on the periphery of a disk 88 supported by a square shaft 89 in turn supported by the framework of the machine. The internal teeth of the gear 87 mesh with and drive a pinion 90 journaled in a bore in the disk 88, said pinion supporting and driving a square shaft 91, which, by means of other similar pinions 90, drives internal-external gears 92, which mesh with and drive gears 93 and 93, rotatably supported by a shaft 94 journaled in the main frames 30. The gear 93 meshes with a pinion integral with a roller-type back indicator 95 free on a shaft 96 journaled in the frames 30. The back indicator 95, which corresponds to the denominational order of amount keys being described, has numerals on the face thereof, which are visible through the transparent pane of a window 97 in the cabinet 33. The gear 98 (Fig. 1) meshes with a pinion integral with a front indicator 99 free on a shaft 100 supported by the main frames 30. The front indicator 99 has numerals on its face, which are visible through the transparent pane of a window 101 in the forward portion of the cabinet 33.

The small square shaft 91 (Figs. 1, 3, 15, and 22), through one of the pinions 90, drives an internal-external gear 104 rotatably supported on a disk similar to the disk 88. The external teeth of the gear 104 mesh with and drive a corresponding upper type wheel 105, free on a shaft 106 journaled in the machine framework, and a corresponding lower type wheel 107 free on an extension of the shaft 86. Coacting with the upper type wheel 105 is an impression hammer 108, and coacting with the lower type wheel 107 is an impression hammer 109 (Figs. 3 and 15), which hammers, through the medium of corresponding inking ribbons 110 and 111, record the values set up on said type wheels 105 and 107 upon suitable record materials 112 and 113.

The present adaptation of the machine of this invention contemplates the inclusion of right-hand upper and lower sets of type wheels 105 and 107 (Figs. 15 and 22), the upper set of which may be used for recording data upon a detail strip and the lower set of which may be used for recording data upon an issuing receipt. It also contemplates the inclusion of a left-hand set of lower type wheels 102 (Figs. 3 and 22) and their corresponding impression hammer 103, similar in every respect to the right-hand lower set, for recording data upon a ledger card, pass-book, or other appropriate record material.

A further illustration of the flexibility of the machine of this invention is the contemplated omission of the indicating mechanism, in certain adaptations, and providing in its place a traveling carriage which may be tabulated to various columnar positions for the recording of various data in identifying columns of suitable multi-columnar record material supported by said traveling carriage. It is apparent that, with the novel and efficient internal-external transmission gear mechanism, it is but a matter of assembly to include as many of the driving gears 104 (Figs. 15 and 22) as necessary to drive the desired number of type wheels 102, 105, and 107 to record identical data in the various columns of multi-columnar record material supported by a traveling carriage, shiftable table, or other suitable means for tabulating or side-spacing and line-spacing said record material.

Secondary differential member restoring mechanism

In the first part of machine operation, the secondary differential members and connected mechanisms, including the corresponding type wheels and indicators, are restored from the positions in which they were set in the previous operation to a neutral or starting position, which in this case is the eleventh position, by mechanism now to be described.

The gear 85 (Figs. 1, 4, and 5) carries a stud 114 coacting with a finger 115 on a disk 116 mounted on the shaft 86, said disk having a tongue 117 extending within a driving groove 118 formed lengthwise in the shaft 86.

Oscillating movement is imparted to the shaft 86 through a pinion 119 (Fig. 19) secured thereto, the teeth of which mesh with one set of teeth in an operating segment 120 free on the shaft 67. The segment 120 has another set of teeth which mesh with teeth in a sector 121 free on a shaft 132 supported by the machine framework. An upwardly extending arm of the sector 121 has a slot 122 supporting a shiftable connecting stud 123, said stud being retained against lateral displacement in said slot 122 by means of an enlarged shoulder thereon and by means of a retaining clip which engages an annular groove in said stud. Normally an extending tenon of the stud 123 engages a notch formed in an upper extension of a cam lever 124 free on the shaft 132, said cam lever having Y-shaped extensions carrying rollers 125 and 126, which coact, respectively, with the peripheries of companion plate cams 127 and 128 secured on the main cam shaft 63.

Under normal conditions, the stud 123 (Fig. 19) connects the sector 121 and the lever 124 for unitary movement, as shown here. In repeat operations, however, means is provided for shifting said stud upwardly to disconnect the operating lever 124 from the sector 121 to prevent restoration of the differential secondary members in such operations. The stud 123 is shifted upwardly by means of a left-hand tenon thereof, which engages an arcuate slot 129 in an arm 130 secured on a shaft 131 supported by the machine framework. The manner in which the shaft 131 and the arm 130 are rocked by the depression of a repeat key will be explained presently in connection with repeat operations. However, under normal conditions said parts are in the position shown in Fig. 19, and under such conditions the stud 123 rides back and forth in the slot 129 while performing its function of connecting the lever 124 and the sector 121 for unitary movement.

In all operations except repeat operations, one counter-clockwise revolution of the shaft 63 and the cams 127 and 128 rocks the lever 124 and the sector 121 first counter-clockwise (Fig. 19) and back to normal position, which movement, through the segment 120 and the pinion 119, rocks the shaft 86 also first counter-clockwise and back to normal position, according to the time given in space 2 of the time chart (Fig. 21).

In Fig. 4, the primary and secondary differential members 66 and 80 are shown in zero position, which is the normal position for the primary member but is not the normal position for said secondary member. In Figs. 4 and 5, the shaft 86 and the disk 116 are shown in their normal or home positions, and initial counter-clockwise movement of the shaft 86, through the groove 118 coacting with the tongue 117, carries said disk 116 counter-clockwise in unison therewith. Counter-clockwise movement of the disk 116, through the finger 115 in cooperation with the stud 114, carries the gear 85 and the pinion 83 counter-clockwise in unison therewith. Counter-clockwise rotation of the pinion 83 returns the segment 82 and the secondary differential member 80 clockwise from zero position, as shown in Fig. 4, to the eleventh or starting position, as shown in Figs. 6 and 7.

In addition to the stud 81 (Fig. 4), the segment 82 is connected to the secondary differential member 80 by a square stud 134 secured in said secondary member 80 and having an extending tenon which engages a slot 135 in said segment 82, as shown best in Figs. 12 and 13. The stud 134 and the slot 135 permit relative movement of the segment 82 and the secondary member 80 when it is desired to eliminate the printing of zeros in the corresponding order, as will be explained presently. However, under normal conditions—that is, when there is no zero to be eliminated—a roller 136, carried by the segment 82, engages and coacts with the concentric portion of a cam slot 137 (Figs. 11 to 14 inclusive) in a zero elimination segment 138 free on the shaft 67, and consequently said segment 82 and said secondary member 80 rotate in unison under such conditions.

After the secondary member 80 and the segment 82 have been restored to the eleventh position, as shown in Figs. 6 and 7, clockwise return movement is imparted to the shaft 86 and the disk 116 to restore said parts to normal position, as shown in Figs. 8, 9, and 10. It will be noted in this connection that the operating groove 118 in the shaft 86 has sufficient clearance in relation to the tongue 117 to compensate for the diameter of the stud 114 when the disk 116 and the finger 115 are restored to normal position, as shown in Fig. 10.

*Positioning of the primary differential member*

Immediately after the secondary differential member and connected mechanisms have been restored to starting position, which, as stated above, is the eleventh position of the differential mechanism, the primary differential member 66 is positioned under influence of the depressed amount key 35 (Fig. 1), as will now be explained.

Referring particularly to Figs. 1, 4, and 20, the primary differential member 66, for the denominational order being described, has a concentric slot 139, which coacts with a rod 140 supported by two similar bell cranks 141 free on the shaft 67. The bell cranks 141 are pivotally connected by similar links 143 to similar arms 144 secured on opposite ends of a shaft 145 journaled in the machine framework. Also secured on the shaft 145 is a crank 146 (Fig. 20) connected by a link 147 to a lever 148 rotatably supported by the shaft 132. Inverted Y-shaped extensions of the lever 148 carry rollers 149 and 150, which coact, respectively, with the peripheries of companion plate cams 151 and 152 secured on the main cam shaft 63. Also secured on the shaft 145 is an arm 153 carrying a roller 154, which coacts with an external arcuate surface 155 on the beam 77 (Figs. 1 and 4), which beam, it will be remembered, forms an operating connection between the primary member 66 and the secondary member 80.

As previously explained, the main cam shaft 63 and the cams 151 and 152 (Fig. 20) make one counter-clockwise revolution each machine operation to rock the lever 148 first counter-clockwise and then back to normal position. Counter-clockwise movement of the lever 148, through the link 147, rocks the crank 146, the shaft 145, and the arms 144 and 153 first clockwise and then back to normal position. The arms 144 (Fig. 20) in turn, through the links 143, rock the bell cranks 141 and the rod 140 first clockwise and then back to normal position, according to the time given in space 3 of the time chart (Fig. 21). It will be evident upon observing Fig. 6 that, when the secondary differential member 80 is restored to starting position, the arcuate surface 155 on the beam 77 is moved substantially into contact with the corresponding roller 154 on the arm 153. Inasmuch as movement of the secondary member is effectively restrained by the load placed thereon by the type wheel and indicator mechanisms, initial movement of the arms 144 and 153, the bell cranks 141, and the rod 140 withdraws said rod from the bottom of the slot 139 in the primary differential member 66 and at the same time causes the roller 154 to engage the arcuate surface 155. In this case, the stud 79 forms a fulcrum for the beam 77, whereupon the roller 154 rocks said beam clockwise, which through the stud 76 carries the primary differential member 66 clockwise in unison therewith. The beam is assisted in moving the primary member 66 by a spring 156 (Figs. 1 and 6) tensioned between the rod 140 and a stud in said primary differential member, which spring tends to yieldingly carry said primary differential member 66 clockwise in unison with said rod 140.

Initial clockwise movement of the primary differential member 66 (Fig. 1), through the gear segment 65 and the pinion 64, rotates the shaft 52 clockwise, as viewed in Fig. 18, until the lug 50 on the disk 51 contacts the lower end of the depressed amount key 35, which in this case, let it be assumed, is the No. 7 key, to position said parts in accordance with the value of said depressed amount key. This terminates movement of the primary differential member and anchors the lower end of the beam 77, whereupon the stud 76 becomes the fulcrum for said beam. Continued clockwise movement of the arm 153 causes the roller 154, in cooperation with the arcuate surface 155, to rock the beam 77 counter-clockwise (Fig. 8), and said beam, through the stud 79, carries the secondary differential member 80 and the printer segment 82 counter-clockwise in unison therewith from starting position, as shown in Fig. 6, to seventh position, as shown in Fig. 8. Counter-clockwise movement of the segment 82, through the pinion 83 and the gear 85, in cooperation with the two lines of transmission gears and shafts shown in Figs. 1, 3, and 15, positions the corresponding type wheels 102, 105, and 107 and the corresponding indicators 95 and 99 in accordance with the value of the depressed amount key. The rod 140 travels on, as shown in Fig. 8, the full extent of its initial movement, stretching the spring 156.

Counter-clockwise return movement of the arms 144 and 153 (Figs. 1 and 20 and space 3, Fig. 22) and the bell cranks 141 and the rod 140 cause said rod to engage the lower end of the slot 139 and return the primary differential member 66 and connected mechanism, including the shaft 52, from seventh position, as shown in Fig. 8, to zero position, as shown in Fig. 9, and withdraws the roller 154 from the surface 155 of the beam 77 without disturbing the positioning of the secondary differential member 80 and the segment 82, so that said parts and the corresponding type wheels and indicators will remain in set position at the end of machine operation.

By referring to Fig. 6, it will be noted that, when the primary differential member 66 is in zero position and the secondary differential member is in starting position, as shown here, a protruding surface on said secondary member 80 is in contact with a bent-over ear 158 on said primary member 66. Likewise it will be noted by referring to Fig. 8 that, when the primary differential member is positioned under influence of the depressed amount key and the secondary member is positioned in accordance with the position of said primary member, the square stud 134 contacts a protruding surface 159 on said primary member. This provides positive means for stopping said primary and secondary members in their extreme moved positions in relation to each other in either direction of travel.

It will be recalled that in subtracting operations the wheels 68 (Figs. 1 and 2) of the selected totalizers are engaged with the corresponding drive gears 54 prior to initial movement of said gears, the shaft 52, and the primary differential member 66, which movement rotates said wheels in a subtractive direction to subtract therefrom the value of the depressed amount key 35. In adding operations, the wheels of the selected totalizers are engaged with the drive gears 54 after said gears, the shaft 52, and the primary differential member 66, have been positioned under influence of the depressed amount key 35, and return movement of said primary member and connected parts rotates said wheels in an additive direction to add therein the value of said depressed amount key.

In total recording operations, the wheel 68 of the selected totalizer is engaged with the corresponding gear 54 prior to initial movement of said gear, the shaft 52, and the primary differential member 66, which initial movement rotates said selected wheel 68 in a reverse direction until the tripping tooth on the corresponding tripping cam 71 contacts the zero stop pawl 72 to stop said totalizer wheel in zero position. This terminates initial movement of the shaft 52 and the primary differential member 66 and positions said parts in accordance with the amount on said zeroized totalizer wheel. After the primary differential member has thus been positioned, the corresponding secondary differential member 80 is positioned as explained above, in accordance therewith, to in turn position the corresponding type wheels and indicators to the value of the amount standing on said totalizer wheel. Prior to return movement of the primary differential member 66 and the shaft 52 (Fig. 1), the selected totalizer wheel is disengaged from the corresponding gear 54, so that said wheel will remain in a zeroized condition.

A sub-total recording operation is exactly like a total recording operation with the exception that the selected totalizer wheel remains in engagement with the corresponding drive gear 54 (Fig. 1) during return movement of said gear, the shaft 52, and the primary differential member 66, so that said selected totalizer wheel will be restored to its original position.

As previously explained, the shaft 52 (Figs. 1 and 17) carries the ratchet 57, which coacts with the pawl 58, said pawl being controlled in its engagement with the teeth of said ratchet by the cam 62, which functions according to the time given in space 4 of the chart, Fig. 21. Accordingly, the pawl 58 engages the ratchet 57 near the beginning of machine operation and prior to initial movement of the rod 140 and remains in engagement therewith until after the primary and secondary differential members 66 and 80 have been positioned, to prevent any possible retrograde movement of the shaft 52 and said primary member at this time, with the resulting erroneous positioning of said secondary member and the corresponding type wheels and indicators. It will be noted by comparing spaces 3 and 4, Fig. 21, that, prior to restoring of the primary differential member 66, the pawl 58 is rocked out of engagement with the ratchet 57, to free the shaft 52 and the primary differential member 66 for restoring movement.

Differential alining mechanism

The differential mechanism is provided with an alining mechanism which coacts with the secondary differential members to aline said members and connected mechanisms in set positions after they have been positioned under influence of the depressed amount keys 35 (Fig. 1) in adding and subtracting operations, and after they have been positioned under influence of the selected totalizer in sub-total and total recording operations.

The secondary differential member 80 (Figs. 1, 4, and 16) for the denominational order being described, which is representative of all the secondary differential members, has a series of alining teeth 160 on its upper portion, which coact with a corresponding aliner pawl 161 free on the shaft 145 and having a notch which closely embraces the bail of a yoke 162, right and left arms of which are rotatably supported by the shaft 145. A downward extension 163 (Fig. 16) of the left arm of the yoke 162 has pivotally connected thereto the rearward end of a link 164, having, in its forward end, a stud 165, which rides in a slot in an arm 166 secured on the shaft 131. In all operations except repeat operations, a stud 167, carried by the link 164, engages a shifting notch 168 in an upward extension of a cam lever 169 free on the shaft 132. The cam lever 169 carries rollers 170 and 171, which coact, respectively, with the peripheries of companion plate cams 172 and 173 secured on the main cam shaft 63.

The cam shaft 63 and the cams 172 and 173 make one counter-clockwise revolution each machine operation to rock the lever 169 first counter-clockwise and then back to normal position, which movement, through the notch 168, the stud 167, and the link 164, rocks the yoke 163 and the aliner 161 first clockwise and then back to normal position to engage and disengage said aliner 161 with and from the teeth 160 in the secondary member 80 according to the time given in space 1 of the time chart, Fig. 21. It will be noted by observing space 1, Fig. 21, that, at the end of machine operation, the aliner 161 remains engaged with the corresponding secondary differential member 80 to retain said member and connected mechanism, including the corresponding type wheels and indicators, in set positions at the end of machine operation. At the beginning of machine operation, the cams 172 and 173 rock the aliner 161 clockwise out of engagement with the teeth of the secondary differential member 80 prior to the restoration of said member to starting position, as shown in space 2, Fig. 21. After the primary and secondary differential members have been positioned, according to the time given in space 3, Fig. 21, the cams 172 and 173 rock the aliner 161 counter-clockwise into engagement with the corresponding teeth 160 of the secondary differential member 80 to retain said secondary member and connected mechanism in set position.

By referring to Figs. 1, 4, 11, and 12, it will be noted that the secondary differential member 80 has a clearance slot 174, concentric with the slot 139 in the primary member 66, to provide clearance for the rod 140. It will likewise be noted that the large central opening in the segment 82 provides clearance for said rod 140.

Repeat mechanism

The unique differential mechanism disclosed herein makes possible the provision of a novel repeat mechanism which may be used any time it is desired to repeat the amount of a previous operation without any foreknowledge on the part of the operator that such amount is to be repeated. To repeat the amount of the previous operation, all that is required is the depression of a conveniently located repeat key, which depression effects the disabling of the secondary differential member restoring mechanism (Fig. 19) and the differential aliner mechanism (Fig. 16), whereupon the secondary differential member 80 and connected mechanisms are retained in their preset positions, and said secondary member then positions the primary differential member 66 in accordance therewith to repeat and enter the amount of the previous operation either positively or negatively in the selected totalizer or totalizers.

Secured on the repeat shaft 131 (Fig. 16) is a crank 176 pivotally connected by a link 177 to a bell crank 178 free on a stationary stud 180. A forward arm of the bell crank 178 carries a rivet 181, which operatively connects said arm to the stem of a repeat key 182 having, on its upper end, a finger piece which extends through a corresponding opening in the keyboard plate 37 (Fig. 1) and having the lower end of its stem undercut to fit a corresponding opening in a bracket 183 secured to the keyboard framework. A spring 184, tensioned between a stationary stud and the crank 176, urges said crank, the shaft 131, and the arms 166 and 130 (Figs. 16 and 19) clockwise and, through the link 177, urges the bell crank 178 also clockwise to yieldingly retain the repeat key 182 in its upward or undepressed position, as shown here. Retaining the crank 176, the shaft 131, and the arms 166 and 130 in their clockwise or normal position retains the stud 167 in engagement with the notch 168 in the lever 169 and retains the stud 123 in engagement with the notch in the upper end of the lever 124, thereby causing the differential aliner mechanism and the differential restoring mechanism to function normally in the manner explained earlier.

Depression of the repeat key 182, through the bell crank 178, the link 177, and the crank 176, rocks the shaft 131 and the arms 166 and 130 (Figs. 16 and 19) counter-clockwise against the action of the spring 184. Counter-clockwise movement of the arm 166, through the slot therein in cooperation with the stud 165, shifts the link 164 upwardly or clockwise, to move the stud 167 out of engagement with the shifting notch 168 in the lever 169 and to simultaneously engage the stud 165 with a notch 185 in a bracket 186 secured to the machine framework. Operation of the machine causes the lever 169 (Fig. 16) to move idly back and forth without imparting any movement to the aliner 161, the stud 165, in cooperation with the notch 185, locking said aliner in engagement with the teeth of the secondary differential member 80 to insure that said member and connected mechanisms remain in the positions in which they were set in the preceding operation. Counter-clockwise movement of the arm 130 (Fig. 19) upon depression of the repeat key 182, through the slot 129, shifts the stud 123 upwardly out of engagement with the shifting notch in the upward extension of the lever 124, whereupon said lever rocks idly back and forth during machine operation without imparting any movement to the secondary differential member restoring mechanism, including the sector 121, the segment 120, the pinion 119, and the shaft 86. Inasmuch as the restoring mechanism for the secondary differential member 80 and the aliner mechanism for said secondary differential member and connected mechanisms are disabled in repeat operations, said secondary member remains in the position in which it was set in the previous operation and during machine operation positions the corresponding primary differential member 66 in accordance therewith to enter the amount of the previous operation in the selected totalizer or totalizers, in the manner explained in connection with adding and subtracting operations.

It is obvious that transfer total operations may be effected by the simple expedient of depressing the repeat key 182 to repeat the amount of a previous sub-total or total recording operation, and such amount may be simultaneously entered in any number of selected totalizers.

Counter-clockwise movement of the crank 176 (Fig. 16), upon depression of the repeat key 182, causes a tooth 187 on its lower end to engage a corresponding tooth 188 on a repeat key latch 189 free on the shaft 132 and rock said latch 189 counter-clockwise against the action of a spring 190, which spring normally maintains said latch in yielding engagement with a stationary stop stud 191. When the tooth 187 moves beyond or by-passes the tooth 188, the spring 190 returns said tooth 188 into the path of the tooth 187 to retain the crank 176 in its counter-clockwise position. The crank 176, through the link 177 and the bell crank 178, retains the repeat key 182 in depressed position and likewise retains the arms 166 and 130 (Figs. 16 and 19) in their counter-clockwise positions near the end of repeat operations.

Near the end of repeat operations and after the amount of such operations has been entered, recorded, and indicated, a stud 192, carried by the cam 172 (Fig. 16), engages a cam node 193 on a rearward extension of the latch 189 and rocks said latch counter-clockwise, against the action of the spring 190, to move the tooth 188 out of the path of the tooth 187 to release the crank 176 to the action of the spring 184, which immediately restores said crank and connected parts to normal positions. This restores the repeat key 182 to undepressed position and engages the stud 167 with the notch 168 in the lever 169 and simultaneously engages the stud 123 (Fig. 19) with the notch in the lever 124 in preparation for the succeeding machine operation.

By referring to Figs. 16 and 19, it will be seen that the forward wall of the notch 168 in the upper end of the lever 169 and the forward wall of the notch in the upper end of the lever 124 extend considerably above the rearward walls of said notches to form alining extensions which coact with the studs 167 and 123, upon clockwise return movement of said levers, to insure that said studs are alined with their corresponding shifting notches for proper engagement therewith upon release of the repeat key mechanism to the action of the spring 184, as explained above.

Zero elimination mechanism

The novel differential mechanism for the machine embodying the present invention is provided with a zero elimination mechanism for eliminating the printing and indicating of zeros in the higher order denominations. Depression of an amount key, with the exception of the zero key, in any particular order and subsequent operation of the machine render the zero elimination mechanism for that order and for all lower orders inoperative, so that the zeros will print in all said lower orders.

Accounting machines of this type are usually arranged so that the zeros in the three lowest orders, including the units and tens of cents and the units of dollars, always record and indicate. However, this is a matter of choice, and the machine may be arranged so that the zeros in all orders will be eliminated, or so that the zeros of certain orders only will be eliminated.

The zero elimination mechanism of the present adaptation is incorporated in the secondary portion of the differential mechanism, and, as a result, the zeros are eliminated in both the printing and the indicating mechanisms. This differs from the usual practice of having the zero elimination mechanism incorporated in the printing mechanism, which eliminates only the printing of zeros in the higher orders, while all of said higher order zeros continue to be indicated. The elimination of the zeros in the indication mechanism greatly improves the appearance of the indicating mechanism and likewise performs a useful function by simplifying and facilitating the reading of the amount indicated.

As previously explained, the printer segment 82 for the denominational order being described (Figs. 1 and 11 to 14 inclusive) carries the roller 136, which coacts with the cam slot 137 in the zero elimination segment 138 free on the shaft 67. The zero elimination segment 138 has a projection 195 formed by an undercut peripheral surface 196, which projection coacts with a bail of a yoke 197, the parallel arms of which are rotatably supported by the shaft 67. The yoke 197 carries a rod 198, which rotatably supports a zero elimination yoke 199 for the denominational order shown here and a similar yoke for each of the other denominational orders (Fig. 22) in which it is desired to eliminate the printing and indicating of zeros. The yoke 199 has a bent-over ear 200, which coacts with a finished surface 201 on the adjacent higher order yoke 199. The bail of the yoke 199 coacts with a shoulder 202 formed by the peripheral surface 196 and with an adjacent peripheral surface 203 on the segment 138. A spring 204, tensioned between a hook formed on the bail of the yoke 197 and a stud in a rearward extension of the right arm of the yoke 199, as viewed in Fig. 22, urges said yoke 199 clockwise (Fig. 11) to normally maintain its bail in yielding engagement with the peripheral surfaces 196 and 203. An upward extension of the left arm of the yoke 197 (Fig. 11) is pivotally connected by a link 205 to an upward arm of a lever 206 free on the shaft 132, said lever carrying rollers 207 and 208, which coact, respectively, with the peripheries of companion plate cams 209 and 210 secured on the cam shaft 63. The cams 209 and 210 make one counter-clockwise revolution each machine operation to rock the lever 206 and, through the link 205, the yoke 197 first counter-clockwise and then back to normal position, according to the time given in space 5 of the time chart, Fig. 21.

It will be recalled by referring to Fig. 4 that near the end of machine operation the rod 140, operating according to the time given in space 3, Fig. 21, returns the primary differential member 66 to zero position, as shown here, which is determined by a stud 211 carried by said primary member 66 contacting a stop bar 212 secured between the main frames 30, said primary member 66 operating in a corresponding guide slot formed in said bar 212. Near the beginning of machine operation, the cams 209 and 210 (Fig. 11 and space 5, Fig. 21) impart initial movement in a counter-clockwise direction to the yoke 197 to rock said yoke from the position shown in Fig. 11 to that shown in Fig. 12, to cause the bail of said yoke, in cooperation with the projection 195, to restore the zero elimination segment 138 to ineffective position, in which the upper camming portion of the slot 137 in said segment is out of the operating range of the roller 136.

Initial counter-clockwise movement of the yoke 197 (Figs. 11 and 12) causes a camming surface 213, formed on the rearward extension of the yoke 199, to ride onto a corresponding camming surface on the bar 212 to retain the bail of said yoke 199 out of the path of the shoulder 202 on the segment 138.

In case the zero key 35 (Fig. 1) is depressed in the denominational order being described, the primary differential member 66 remains in zero position, as shown in Figs. 1 and 12, in which an extreme peripheral surface 214 thereof exposes the shoulder 202 to the bail of the yoke 199. Return movement of the yoke 197 disengages the camming surface 213 on the yoke 199 from the bar 212 and permits the spring 204 to move the bail of said yoke into engagement with the shoulder 202, as shown in Fig. 13, to cause said yoke 197 to carry the segment 138 clockwise in unison therewith from the position shown in Figs. 12 and 13 to the position shown in Fig. 14. By comparing spaces 3 and 5, Fig. 21, it will be seen that the zero elimination segment 138 is moved to eliminating position, as shown in Fig. 14, prior to completion of the positioning movement of the differential members, and as in this case the primary member 66 is positioned at zero under influence of the corresponding zero key 35 or other suitable zero stop mechanism, the secondary differential member 80 and the segment 82 will likewise be positioned at zero in accordance therewith, as shown in Fig. 14. With the zero elimination segment 138 in eliminating position (Fig. 14), movement of the secondary differential member and the corresponding segment 82 to zero position causes the roller 136 carried by said segment, in cooperation with the upper camming portion of the slot 137, to rock said segment 82 counter-clockwise on its pivot stud 81 and in relation to said secondary member 80, one position beyond zero, which, through the gearing shown in Fig. 1 and explained earlier herein, moves the corresponding type wheels and indicators one position beyond zero to a blank position, in this case the eleventh position, to eliminate the printing and indicating of the zero in this denominational order.

By referring to Figs. 13 and 22, it will be understood that movement of the zero elimination yoke 199 clockwise into the path of the shoulder 202 withdraws the surface 201 from the protruding ear 200 of the adjacent lower order elimination yoke 199, thus permitting said lower order yoke to likewise rock into the path of and engage the shoulder 202 of its corresponding zero elimination segment 138, to eliminate the printing and indicating of the zero in said lower denominational order, in exactly the same manner as explained for the order shown here. This eliminating action extends progressively through all the lower orders which are provided with a zero elimination mechanism.

When the primary differential member 66 (Figs. 1 and 12) is positioned in other than zero position, under influence of the amount keys 35, the extreme peripheral surface 214 on said primary member shields the shoulder 202 from the bail of the yoke 199; consequently said bail rides idly upon said peripheral surface 214 and upon the corresponding radially alined peripheral surface 203 on the segment 138 without imparting any movement to said segment 138. This causes the yoke 199 to remain in its counter-clockwise position, as shown in Fig. 11, whereupon the surface 201 thereon, in cooperation with the ear 200 (Fig. 22) of the adjacent lower order eliminating yoke 199 likewise retains said lower order yoke in its counter-clockwise position out of the path of the shoulder 202 on the corresponding zero eliminating segment 138, to permit the zero in said adjacent lower order to be printed and indicated, and this action extends progressively through all of the lower orders which are provided with zero elimination mechanism.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, the combination of digital amount keys for one denominational order; a plurality of totalizers, each having a totalizer member for said one denominational order; a rotatable differential device for said one denominational order; a shaft extending lengthwise beneath the amount keys and extending lengthwise above the totalizer members, said shaft having its axis at right angles to the axis of the differential device and constructed and arranged to be operated thereby; a stop means on the shaft for each amount key and coacting with the corresponding effective amount key to position said shaft and the differential device according to the value of said effective amount key; and a driving part on the shaft for each totalizer member and engageable by the selected ones of said totalizer members to transmit the value of the effective amount key to said selected totalizer members.

2. In a machine of the class described, having a series of depressible amount keys for one denominational order, said keys being equally spaced apart, the combination of a shaft extending lengthwise of and beneath the amount keys; a differential device to operate the shaft; a stop means on the shaft for each amount key, said stop means being spaced in relation to the corresponding amount keys and coacting with the depressed amount key upon operation of the shaft to position said shaft and the differential device according to the value of said depressed amount key; a plurality of totalizers each having a totalizer gear wheel for said one denominational order, said wheels being located beneath the shaft and properly spaced in relation to the length of said shaft; and a driving gear for each totalizer wheel secured on the shaft opposite the corresponding totalizer wheel and engageable by the selected ones of said totalizer wheels to enter the value of said depressed amount key therein.

3. In a machine of the class described having means to record values, the combination of a denominational row of depressible value keys vertically arranged and equally spaced in relation to each other; a horizontal shaft extending lengthwise of and beneath the ends of the value keys; a stop part for each value key secured on the shaft opposite the corresponding key and arranged to engage the corresponding depressed key to position the shaft accordingly; a differential device comprising a primary member operatively connected to the shaft and a secondary member operatively connected to the recording means, said secondary member positioned by said primary member; and means to drive the differential device and the shaft to cause said shaft, the primary member and the secondary member to be positioned according to the value of the depressed value key.

4. In a machine of the class described, having a row of amount keys of one denominational order to set up values, means to record the values set up, and a plurality of totalizer elements of said one denominational order to receive the values set up, the combination of a shaft underlying the keys and overlying the totalizer elements; a primary differential member operatively connected to the shaft; a secondary differential member operatively connected to the recording means, said differential members rotatable on a common axis which is at right angles to the axis of the shaft; a beam connecting the differential members; means coacting with the beam to position the differential members; means on the shaft coacting with the effective amount key to position said shaft, the primary and secondary members, and the recording means in accordance with the value of the effective amount key; and driving means on the shaft engageable by the totalizer elements to enter the value of the effective amount key therein.

5. In a machine of the class described, having a plurality of denominational rows of amount keys to set up values, a plurality of totalizers with denominational elements corresponding to the rows of amount keys, and means to record the values set up, the combination of a shaft for each denominational row of amount keys, said shafts underlying the corresponding rows of amount keys and overlying the corresponding denominational elements of the totalizers; a differential device for each denominational row of amount keys and operatively connected to the corresponding shaft and rotatable on an axis at right angles to that of the corresponding shaft, said differential devices operatively connected to the recording means; means to drive the differential devices and the corresponding shafts; means on each shaft coacting with the corresponding amount keys to position said shafts, the differential devices, and the recording means in accordance with the effective amount keys; and means on each shaft coacting with the corresponding totalizer elements to enter the values of the effective amount keys therein.

6. In a machine of the class described, having denominational orders of amount keys to set up values, means to record the values set up, and a plurality of totalizers with denominational elements corresponding to the orders of amount keys to receive the values set up, the combination of a horizontal shaft for each denominational order, said shafts underlying the corresponding orders of amount keys and overlying the corresponding orders of totalizer elements; a primary differential member for each order, said members operatively connected to the corresponding shafts; a secondary differential member for each order, said members positioned by the corresponding primary members and operatively connected to the recording means; means to drive the differential members and the shafts; a positioning part on each of the shafts for each corresponding amount key, whereupon operation of the differential driving means causes the shafts, the primary and the secondary differential members, and the recording means to be positioned in accordance with the effective amount keys; and a driving member on each of the shafts for each corresponding totalizer element and engageable by said totalizer elements to enter the value of the effective amount keys therein.

7. In a machine of the class described, having a denominational row of amount keys and a plurality of totalizers each having a denominational element corresponding to the denomination of the row of amount keys, said totalizer elements underlying said amount keys, the combination of a shaft extending beneath and lengthwise the row of amount keys and extending above the corresponding totalizer elements; means to drive the shaft; a stop member on the shaft for each amount key, and coacting with the effective amount key to position said shaft in accordance with said effective amount key; and a driving part on the shaft for each corresponding totalizer element and engageable by said totalizer elements to enter the value of the effective amount key therein.

8. In a machine of the class described, the combination of a denominational row of depressible amount keys having the lower ends of their stems in horizontal alinement; a plurality of totalizers each having a denominational totalizer wheel corresponding to the amount keys and disposed beneath and parallel to the lower ends of the stems of said amount keys; a shaft extending lengthwise of the amount keys and disposed beneath the lower ends of said keys and above the corresponding totalizer wheels, said shaft having its axis parallel to said lower ends of said keys and parallel to said corresponding totalizer wheels; means to drive the shaft; a stop member on the shaft for each key and so spaced along the shaft as to be engageable with the lower end of the corresponding depressed key to position said shaft according to the value of said depressed key; and a drive wheel on the shaft for each corresponding totalizer wheel and so spaced along said shaft as to be engageable by said totalizer wheels to enter the value of the depressed amount key therein.

9. In a machine of the class described, having means to record and indicate values, the combination of a horizontal shaft; a primary differential member operatively connected to the shaft; a secondary differential member operatively connected to the recording and indicating means; a beam to connect the primary and secondary members for complementary positioning movement; means coacting with the beam to position the primary and secondary members and the shaft; a denominational row of depressible amount keys disposed above the shaft and having the lower ends of their stems in parallel alinement with said shaft; a plurality of totalizers each having a denominational element corresponding to the denomination of the amount keys, said elements disposed below and in parallel alinement with the shaft; a stop member on the shaft for each amount key, said stop members so distributed along said shaft as to be engageable with the lower ends of the stems of the corresponding amount keys when depressed, to position said shaft, the differential members, and the recording and indicating means accordingly; and a driving part on the shaft for each corresponding denominational element of the totalizers, said driving parts so distributed along said shaft as to be engageable by the corresponding totalizer elements to enter the value of the depressed amount key therein.

10. In a machine of the class described, the combination of a series of amount keys of one denominational order equally spaced in a single row; a shaft extending the full length of the row of amount keys and located opposite and parallel to the inner ends of said amount keys; means to actuate the shaft; a stop member for each amount key secured on the shaft opposite the inner ends of the corresponding amount key and coacting with said corresponding amount key, when it is depressed, to cause the actuating means to position said shaft according to the value of said depressed key; a plurality of totalizers, each having a totalizer element of said one denominational order said elements located opposite the shaft and parallel in relation thereto; and a driving member for each totalizer element said driving members distributed among the stop members along the shaft and coacting with said totalizer elements to enter the value of the depressed amount key therein.

11. In a machine of the class described, having means to record and indicate values, the combination of a horizontal shaft; means including a differential device to actuate the shaft; a full complement of depressible numeral keys of one denominational order equally spaced in a single row, the inner ends of said keys being opposite and parallel to the shaft; a combined stop and positioning lug for each numeral key, said lugs secured on the shaft opposite the inner ends of the corresponding numeral keys and coacting with said corresponding keys, when depressed, to cause the differential device to position the shaft according to the numerical value of said depressed key; a plurality of totalizers each having a totalizer element of said one denominational order, said totalizer elements located opposite and parallel to said shaft; a driving member for each totalizer element secured on the shaft and distributed among the stop lugs, said driving members coacting with said totalizer elements to enter the value of the depressed numeral key therein; and operating connections between the differential device and the recording and indicating means to transmit the value of said depressed numeral key thereto.

12. In a machine of the class described having means to record digital values, means to indicate values and means to set up digital values, including zero, the combination of a primary differential member positionable under control of the setting up means to positions corresponding to various digital values, including zero; a secondary differential member positionable by the primary member; means includin ga gear segment rockably mounted on the secondary member to form an operating connection between said secondary member and the recording and indicating means so that the positioning of the primary and secondary differential members will be transmitted to said recording and indicating means; segment control means normally effective to cause the segment to move in unison with the secondary member so that the position of the said secondary member will be transferred to the recording and indicating means; and means controlled by the primary member and coacting with the segment control means, when said primary member is positioned at zero, to cause said segment control means to rock the segment relatively the secondary differential member, when said secondary member is positioned at zero, to cause said segment to move the recording and indicating means from zero recording and indicating position to a non-recording and a non-indicating position.

13. In a machine of the class described having positionable recording and indicating means, the combination of a primary differential member adjustable to various positions including a certain position; a secondary differential member positioned by the primary member and in accordance therewith, said differential members rotatable about a common axis; a gear segment pivotally mounted on the secondary member and operatively connected to the recording and indicating means; a projection on the segment; a part having a control slot coacting with the projection to normally retain the segment in fixed axial relationship with the secondary member so that the recording and indicating means will be positioned in accordance therewith; and means rendered effective by the primary member when it is in said certain position and coacting with the part to cause the control slot in cooperation with the projection to move the segment about its pivot and eccentrically to the axis of the secondary member to another position which is beyond the range of operation of said secondary member, to position the recording and indicating means in said another position.

14. In a zero printing control mechanism for accounting machines having means to record and indicate numbers including zero, the combination of a primary differential member positionable to various numerical positions including zero; a secondary differential member positioned under control of the primary differential member and in accordance therewith, said differential members being mounted on a common axis; means including a gear segment movably mounted on the secondary differential member and operating to connect said secondary differential member to the recording and indicating means to transmit the positioning of said secondary member thereto; a projection on the segment; a part; a control slot in the part coacting with the projection to normally retain the segment in fixed axial relationship with the secondary member, so that the positioning of said secondary member will be transmitted to the recording and indicating means; and means rendered operable by the primary differential member when it is positioned in zero position to actuate the part to cause the control slot in cooperation with the projection to move the segment eccentrically to the axis of the secondary member to a position beyond zero and to which position said segment cannot be moved by the differential members, to position the recording and indicating means in a non-recording and a non-indicating position.

15. In a machine of the class described having elements to set up amounts and totalizers to receive the set up amounts, the combination of a primary differential member positioned by the elements in adding and subtracting operations and by any selected one of the totalizers in total-taking operations; a secondary differential member; means to restore the secondary member to a starting position at the beginning of each machine operation; means to operate the restoring means; means normally effective to move the secondary member from said starting position to a position corresponding to the position of the primary member, said secondary member constructed and arranged to remain in said moved position at end of machine operation; alining means for the secondary members, said alining means disengageable from said secondary member while it is being restored and while it is being positioned and engageable with said secondary member after it has been positioned; means to operate the alining means; and manually operable means to disconnect the alining means and the restoring means from their respective operating means prior to machine operation to cause the secondary member to remain in said moved position to repeat the amount of the previous operation.

16. In a repeat mechanism for accounting machines, the combination of a differential member; means to set the differential member in positions corresponding to various values, said member constructed and arranged to remain in set position at the end of machine operation; means normally effective to restore the member from set position to a starting position at the beginning of each machine operation; means to operate the restoring means; alining means engageable with the member to aline it in set position, said alining means disengageable from said member while it is being restored and while it is being set; means to operate the alining means; and manually operable means operable prior to machine operation to disconnect the alining means and the restoring means from their respective operating means to cause the member to remain in the position in which it was set in the previous operation.

17. In a machine of the class described, having elements to set up amounts and totalizers to receive amounts, the combination of a primary differential member; a secondary differential member; means forming an operating connection between the primary member, the amount elements, and the totalizers, whereby the primary member is positioned by said elements in adding and subtracting operations and by said totalizers in total-taking operations; means to restore the primary member to a starting position at the end of machine operations; means to restore the secondary member to a starting position at the beginning of machine operations; means to operate the restoring means for the secondary member; means intermediate the primary and secondary members and functioning after the secondary member has been restored to position the primary member in accordance with the effective amount element or selected totalizer and to position the secondary member in accordance with the primary member; alining means engageable with the secondary member after it has been positioned to retain said secondary member in set position; means to operate the alining means; and manually operable means effective in a subsequent operation to disconnect the restoring means for the secondary member and the alining means for the secondary member from their respective operating means to cause said secondary member to remain in preset position and to position the primary member accordingly to repeat the amount of the previous operation.

18. In a machine of the character described, having a series of digital amount keys for each denominational order to set up values, means to record the set-up values, and a plurality of totalizers each having a totalizer element for each denominational order to receive the set-up values, the combination of a primary differential member for each denominational order; a secondary differential member for each denominational order, said secondary member operatively connected to the recording means, said primary and secondary differential members rotatable on a common axis; a beam for operatively connecting the primary and secondary members of each denominational order; means coacting with the beams to drive and position the differential members; a shaft operatively connected to each primary differential member and having its axis at right angles to that of the differential members, said shafts underlying the corresponding orders of amount keys and overlying the corresponding order of totalizer elements; positioning means on each shaft coacting with the corresponding amount keys to position said shafts, the corresponding primary and secondary members, and the recording means in accordance with the value of the effective amount keys; and driving means on each shaft engageable by the corresponding totalizer elements of the corresponding denominational orders to enter the value of the effective amount keys therein.

19. In a machine of the character described, having means to set up, record, and indicate values, including zero, the combination of a rotary primary differential member adjustable to various positions under control of the setting-up means; a rotary secondary differential member positioned by the primary member, said primary and secondary members being mounted on a common axis; a gear segment movably mounted on the secondary member and operatively connected to the recording and indicating means; positionable control means for the segment; means normally effective to move the positionable control means to one position to cause the segment to rotate in unison with the secondary member to position the recording and indicating means in accordance therewith; and means mounted on the moving means and rendered effective by the primary differential member when said member is positioned in zero to move the positionable control means to another position to cause the segment to move eccentrically to the secondary member to position said recording and indicating means in a non-recording and a non-indicating position.

20. In a machine of the class described, having means to record and means to indicate numerical values, the combination of a rotary primary differential member positionable to various numerical positions, including zero position; a rotary secondary differential member positionable by and in accordance with the primary member, said differential members being mounted on a common axis; a gear segment loosely mounted on the secondary member and operatively connected to the recording and indicating means; a control plate for the segment, said control plate rotatably mounted on the common axis; means normally effective to position the control plate so that it will cause the segment to move in synchronism with the secondary member to transmit the positioning of said secondary member to the recording and indicating means; and means connected to the positioning means and controlled by the primary member and effective when said primary member and secondary member are positioned at zero to change the position of the control plate so that it will cause the segment to move out of synchronism with the secondary member to move the recording and indicating means away from zero position to an ineffective position.

21. In a machine of the class described, having value-setting means and means to record and indicate values, the combination of a primary differential member settable to various positions corresponding to numerical values including a certain position under control of the value-setting means; a secondary differential member; a common axle for rotatably supporting the primary and secondary differential members; means to restore the secondary differential member to a starting position in each machine operation, after which said secondary member is settable under control of the primary member in accordance with the position of said primary member; a gear segment pivotally mounted on the secondary member and operatively connected to the recording and indicating means; control means for the segment normally effective to cause said segment to rotate in unison with said secondary member and concentrically to the axle to transmit the positioning of the primary member to the recording and indicating means; and means controlled by the primary member when it is set in said certain position and coacting with the control means to vary its control over the segment to cause said segment to rotate out of unison with the secondary member and eccentrically to the axle to move the recording and indicating means from said certain position to an ineffective position.

GUNNAR NELSON.

REFERENCES CITED

The following references are of record in the file of this patent:

UNITED STATES PATENTS

| Number | Name | Date |
|---|---|---|
| 312,014 | Pottin | Feb. 10, 1885 |
| 700,748 | Dement | May 27, 1902 |
| 703,188 | Dement | June 24, 1902 |
| 1,426,419 | Smith | Aug. 22, 1922 |
| 1,842,950 | Robertson | Jan. 26, 1932 |
| 2,029,776 | Jacob | Feb. 4, 1936 |
| 2,050,022 | Shipley | Aug. 4, 1936 |
| 2,057,606 | Campos | Oct. 13, 1936 |
| 2,071,141 | Placke | Feb. 16, 1937 |
| 2,273,985 | Paden | Feb. 24, 1942 |
| 2,282,120 | Demeulenaere | May 5, 1942 |
| 2,334,953 | Petit | Nov. 23, 1943 |
| 2,374,760 | Lindstein | May 1, 1945 |
| 2,376,481 | Gubelmann | May 22, 1945 |

FOREIGN PATENTS

| Number | Country | Date |
|---|---|---|
| 527,155 | Germany | June 13, 1931 |